A. R. HAGSTROM.
VEHICLE ATTACHMENT.
APPLICATION FILED SEPT. 3, 1910.
1,032,134.
Patented July 9, 1912.
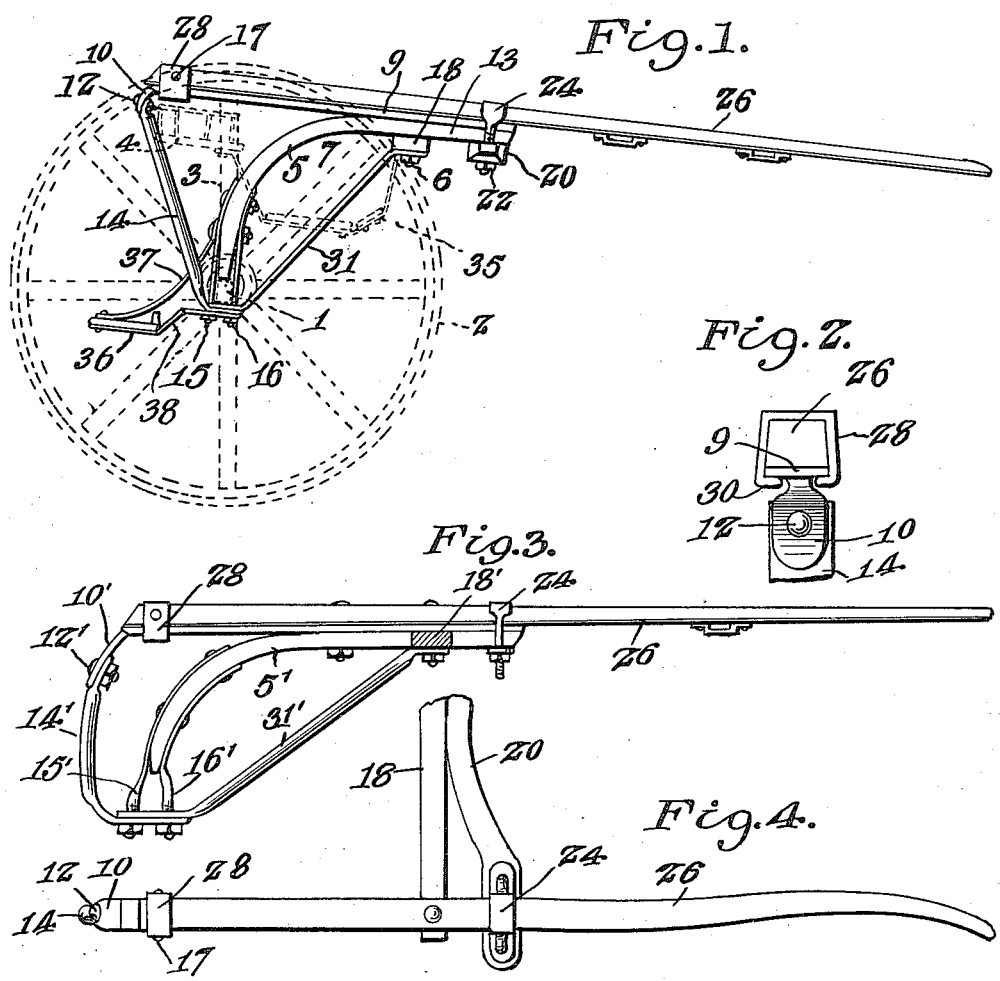
WITNESSES:
Joe. P. Wahler
A. McCarthy
INVENTOR
A. R. Hagstrom.
BY
Attorney

UNITED STATES PATENT OFFICE.

ANDERS R. HAGSTROM, OF WATAGA, ILLINOIS.

VEHICLE ATTACHMENT.

1,032,134.    Specification of Letters Patent.    Patented July 9, 1912.

Application filed September 3, 1910. Serial No. 580,308.

*To all whom it may concern:*

Be it known that I, ANDERS RANDALL HAGSTROM, a citizen of the United States, and a resident of Wataga, in the county of Knox and State of Illinois, have invented certain new and useful Improvements in Vehicle Attachments, of which the following is a specification, reference being had to the accompanying drawings.

This invention has relation to certain novel improvements in vehicles.

The primary object of my invention is to provide a simply constructed breaking car constructed so that the shafts can be easily removed or replaced.

Another object is to provide a car with shafts which can be lengthened or shortened.

A further object is to provide a vehicle with a tongue which can be shortened.

With these and other objects in view the present invention consists in the combination and arrangement of parts as will be hereinafter more fully described and particularly pointed out in the appended claims, it being understood that changes in the specific structure shown and described may be made within the scope of the claims without departing from the spirit of the invention.

In the accompanying drawings in which like numerals of reference indicate similar parts in the several views, forming part of this specification:—Figure 1, shows a side elevational view of a car constructed according to my invention. Fig. 2, shows an end detail disclosing the method of securing the shaft to the supporting rail. Fig. 3, shows a side elevation of a slight modification. Fig. 4, shows a fragmentary top view of a shaft and connected braces.

In breaking horses or mules special vehicles are used which are known as breaking cars or sleighs. These vehicles are the first to which the unbroken quadrupeds are harnessed and it is no unusual thing for the shafts or poles of these vehicles to be broken by the untrained animals.

In my present invention I provide a vehicle especially adapted for the training of horses and mules with a simply constructed attachment, to which a shaft or pole can be easily secured or from which the same can be readily detached or removed, and by means of which the driver can have a long or a short hitch.

In the accompanying drawings the numeral 1 designates the axle, 2 the wheel, 3 the springs, 4 the seat of an ordinary sulky. Secured to the axle 1 by means of the strap clips 15 and 16 upon each side, is a stub shaft, 5. These stub shafts at the forward ends are connected by the usual cross and stay braces 18 and 20, shown in Figs. 1 and 4.

As disclosed I secure to the straight upper end, 13, of the stub shaft, 5, a bar 9 serving as a rail, this bar 9 ending in an apertured ear 10, disclosed in Fig. 2. This rail 9 is secured to the shaft 5 in any suitable manner as by means of the bolt 6 which is also employed to secure the cross brace 18 to the shaft 5. Secured to the strap clips 15 and 16 is a metal bar 14, forming a stand, to the upper apertured end of which is attached the end 10 of the rail 9, by means of a suitable bolt, 12. By means of this stand 14, the rear end of the supporting rail 9 is firmly held and practically forms a continuation of the straight horizontal portion 13, of the stub shaft.

Extending through suitable openings in the stay brace, 20, it being understood that the cross bar 18 supports the usual swingle tree, is an ordinary clip 24, this clip, however, being adjustably held so that the same can be moved toward or away from the rail 9. This draw clip 24 is adjusted by means of nuts 22.

Slidably held upon each supporting rail 9 is the rear end of a shaft 26. Each shaft 26 is adjustably held below one of the draw clips 24 and at its rear end carries a yoke 28, as shown in Fig. 2, the ends of the yoke clasping below the supporting rail, 9. The yokes are secured to the shafts by means of the rivets 17. By loosening the nuts 22, and carrying the draw clips 24 upwardly, the shafts 26 can be carried forwardly or backwardly upon the supporting rail so that the operator can arrange for a long or a short hitch. As soon as the shafts 26 have been properly adjusted the nuts 22 are tightened to securely connect the shaft to the supporting rail, and the stub shaft 5. As shown in Fig. 1, these draw clips pass through the stay brace, which is secured below the stub shafts, 5. By means of these draw clips further the elements 26, 9, 5 and 20 are securely connected.

To further strengthen the construction I attach a stay rod, 31, to the bolt 6, securing the cross brace and the strap clip 16, so that the axle 1, is firmly secured to the stub shaft 5, as well as the shaft forming elements.

A bottom 35, of usual construction is, provided, as shown in Fig. 1. The car as disclosed in addition is provided with the rear step 36, upon which the driver may stand, this step being supported by the rods 37 and 38, as shown.

Should one of the shafts 36 be broken, it is simply necessary for the operator to loosen the nuts 22, and then shove the rear shaft portion 26 backwardly, so that the yoke will ride off the supporting rail. In securing the shaft, the front end is first inserted below the loose draw clip 24, and then the yoke 28 is brought into engagement with a supporting rail, when the nuts are again secured to clamp the shaft to its support.

In Fig. 3 is shown a modification in which the cross brace 18' is held between the shaft sections 5', the members 14', 15' and 16' being secured, however, in a manner previously described. An incident of convenience to this arrangement of securing shafts is that a shaft can be instantly replaced. Further, the animal can be hitched near to or a desired distance away from the swingle tree, preventing the driver or the vehicle being injured, should the animal kick.

It is, of course, understood that the device could be a sleigh as well as a car. The device is simple and comparatively inexpensive in construction and both durable and efficient in operation and the shaft adjustments can be made with ease, accuracy and despatch.

Having thus described my said invention, what I claim as new and desire to secure by United States Letters Patent, is:—

1. The combination of an axle, a stub shaft projecting from the axle, a supporting rail secured at the forward end thereof to the stub shaft and projecting rearwardly beyond the said stub shaft, a stand connecting the rear end of the supporting rail to the axle, and a shaft adjustably mounted upon the rail so as to be moved in and out thereon.

2. The combination with an axle, of a stub shaft extending from said axle, a supporting rail having one end secured to said stub shaft, a stand secured to the remaining end of said supporting rail and connecting the same to the axle, a shaft, a yoke upon said shaft engaging said supporting rail, and a draw clip to secure said shaft to said stub shaft.

3. The combination with an axle of a stub shaft, a supporting rail secured to said stub shaft and extending beyond the same and ending in a securing eye, a stand secured at one end to said securing eye and at the opposite end to the axle, a shaft, a yoke secured to said shaft adapted to clasp said supporting rail, and means to secure said shaft in operative position.

In testimony whereof, I affix my signature, in presence of two witnesses.

ANDERS R. HAGSTROM.

Witnesses:
J. R. WARD,
W. R. HAGSTROM.

---

Copies of this patent may be obtained for five cents each, by addressing the "Commissioner of Patents, Washington, D. C."